United States Patent Office 3,022,351
Patented Feb. 20, 1962

3,022,351
PRODUCTION OF ORGANIC POLYSULFIDES
Clifford H. Mihm, Paul F. Warner, and Jackie E. Duke, Phillips, Tex., assignors to Phillips Petroleum Company, a corporation of Delaware
No Drawing. Filed Mar. 7, 1957, Ser. No. 644,452
15 Claims. (Cl. 260—608)

This invention relates to organic polysulfides. In one aspect this invention relates to the preparation of organic polysulfides from mercaptans.

Organic polysulfides and particularly dialkyl polysulfides such as tetra- and penta-sulfides have been found useful for many purposes such as additives for elastomers, antioxidants for lubricating oils, intermediates for the production of organic chemicals, insecticides, germicides and particularly as an additive to diesel fuels to improve the cetane number and ignition qualities of these fuels. These compounds have also been found useful in the compounding of extreme pressure lubricants and in the acceleration of rubber treating processes.

The preparation of these compounds, however, has been a problem of considerable difficulty from an industrial standpoint. Dialkyl polysulfides have heretofore been produced by the interaction of mercaptans with sulfur monochloride or with sulfur dichloride. It has also been proposed to produce organic polysulfides and, in particular the dialkyl polysulfides, by reacting an alkyl mercaptan with sulfur in the presence of an amine catalyst. However, this process produces primarily the disulfide compounds and but minor quantities of the tetra- and penta-sulfides. Further amounts of sulfur may be introduced into the disulfide molecule when employing an amine catalyst either by successive treatments with small amounts of free sulfur in the presence of a basic catalyst with purification at each stage, or by the addition to the reaction mixture containing mercaptan of an excess of sulfur and prolonged time of treatment with the application of heat if necessary.

We have found, quite surprisingly indeed, that alkyl mercaptans, reacted with sulfur in the presence of a particular class of catalysts, to be described hereinafter, and promoted by an aliphatic alcohol will yield polysulfide compounds containing predominant quantities of the tetra- and penta-sulfides and minor amounts of the tri-sulfides.

Accordingly, one or more of the following objects will be achieved by the practice of our invention.

It is an object of this invention to provide an improved process for the production of dialkyl polysulfides, which process is effected in the presence of a novel class of promoted catalysts.

Another object of our invention is to provide an improved process for the production of dialkyl polysulfides containing predominant quantities of tetra- and penta-sulfides.

A further object is to provide a novel one step process of sulfurizing alkyl mercaptan in the presence of a novel class of promoted catalysts.

Other objects will become manifest to those skilled in the art in view of the following discussion.

It has been stated in the prior art that alkyl mercaptans will react with sulfur in the presence of catalysts having an alkaline reaction such as oxides and hydroxides of metals, alkali metals, sulfides, ammonia, amines, etc. However, attempts to effect the sulfurization reaction in the presence of a catalyst such as the hydroxides, sulfides and polysulfides of the alkali metals and alkaline earth metals, at temperatures up to 150° F. have resulted in an insignificant yield of tetra- and penta-sulfurized products.

We have discovered that a class of catalysts, namely the oxides, hydroxides, alcoholates, sulfides, and polysulfides of the alkali metal and alkaline earth metal series such as, for example, sodium hydroxide, potassium hydroxide, potassium sulfide, sodium sulfide, calcium hydroxide, sodium methylate, barium hydroxide, sodium tetra- and penta-sulfides, potassium tetra- and penta-sulfides, etc., when promoted with a minor quantity of an aliphatic alcohol to be described hereinafter causes the sulfurization of the mercaptans to proceed at a rapid rate with the release of large volumes of $H_2S$ gas. The final products are, in the main, dialkyl tetra- and penta-sulfides with only insignificant quantities of dialkyl di- and tri-sulfides being formed.

The mercaptans which are applicable in our invention are the alkyl mercaptans. They may be either straight chain or branch chain and include, among others, methyl mercaptan, ethyl mercaptan, n-propyl mercaptan, isopropyl mercaptan, n-butyl mercaptan, t-butyl mercaptan, hexyl mercaptan, octyl mercaptan, decyl mercaptan, dodecyl mercaptan, tetradecyl mercaptan, hexadecyl mercaptan, octadecyl mercaptan, n-eicosyl mercaptan, triacontyl mercaptan, and higher. In general, alkyl mercaptans containing up to 18 carbon atoms in the alkyl substituent are preferred.

The alcohols which effectively promote the above mentioned catalysts in our sulfurization process are the alkanols such as methyl alcohol, ethyl alcohol, n-butyl alcohol, isobutyl alcohol, hexyl alcohol, octyl alcohol, decyl alcohol, dodecyl alcohol, hexadecyl alcohol, and higher; preferably alkyl alcohols containing up to 8 carbon atoms in the alkyl substituent are preferred. However, it is desirable that the catalysts be soluble in the alkyl alcohol employed.

The amount of alcohol employed in our process is generally in the range from about 0.5 to about 10.0 weight percent, based on the weight of the mercaptan feed. Higher quantities of alcohol, i.e., about 10 weight percent, can be employed in such case, the alcohol in addition to promoting the catalyst also serves as a diluent for the reaction mixture. As a practical matter the upper limitation as to the amount of alcohol employed in the sulfurization process is dictated by economic considerations. The reaction is preferably affected in the presence from about 1.0 to about 2.0 weight percent of alcohol based on weight of the mercaptan feed.

The quantity of catalyst employed is in the range from about 0.05 to about 5.0 weight percent, and higher, based on the weight of the mercaptan feed, preferably from about 0.0 to about 1.0 weight percent.

To effect substantially complete conversion of the alkyl mercaptan to the tetra- and penta-sulfide products, stoichiometric quantities of the mercaptan feed and sulfur are employed. However, excess sulfur can be used.

The sulfurization reaction is carried out at a temperature in the range of about 60° to about 150° F. preferably from about 75° to about 110° F. The time of the reaction is from about 5 minutes to about 3 hours, preferably from about 30 minutes to about 60 minutes, depending on the quantity of the reactants, the design of the apparatus, and other factors. The reaction is conducted at atmospheric pressure but subatmospheric and superatmospheric pressures can be employed. The reaction is generally conducted in the liquid phase.

In commencing the sulfurization reaction, the sulfur and mercaptan reactants can be premixed, and the catalyst, dissolved in the alcohol, is added to the premixed reagents. Alternatively, one can premix the sulfur and mercaptan, introduce the catalyst thereto, and subsequently add an excess of alcohol. In another embodiment, the alcohol, catalyst, and mercaptan are premixed and added to the sulfur. It is understood, therefore, that the particular manner of adding the reagents, catalysts and alcohol is not a critical feature of our process. The reaction products, which are predominantly dialkyl tetra- and penta-sulfides can be recovered by separation means well recognized in the art.

The following data is presented in illustration of the invention:

A series of runs were carried out for the production of dialkyl polysulfides by the reaction of an alkyl mercaptan with sulfur in the presence of a catalyst and an alkanol promoter. In each run the catalyst, mercaptan and sulfur were premixed and the alkanol was added to this mixture immediately. Reaction data were collected for six hours. The results are tabulated in the following table.

alcoholates, alkali metal sulfides, alkali metal polysulfides and alkaline earth metal oxides, and a minor amount of an alkanol at temperatures up to 150° F. and recovering a dialkyl polysulfide product comprising a major proportion of tetra- and penta-sulfides.

3. The process of claim 2 in which the catalyst is sodium hydroxide.

4. The process of claim 2 in which the catalyst is sodium polysulfide.

5. The process of claim 2 in which the catalyst is calcium hydroxide.

6. The process of claim 2 in which the catalyst is potassium sulfide.

7. The process of claim 2 in which the catalyst is sodium sulfide.

*Table*

| Run No. | Catalyst[1] | Mercaptan | | Sulfur, mols | Promoter | | Reaction | | Total conversion mol percent[5] |
|---|---|---|---|---|---|---|---|---|---|
| | | Type | Amount mols | | Type | Weight percent[2] | Temp., °F. | Time, hrs. | |
| 1 | $Na_2S \cdot 9H_2O$ | Tertiary butyl | 1.12 | 2.07 | None | | 76 | 6 | 1.9 |
| 2 | $Na_2S \cdot 9H_2O$ | ------do------ | 1.26 | 2.28 | Methanol | 1.0 | 70-80 | 6 | 51.6 |
| 3 | $Na_2S \cdot 9H_2O$ | ------do------ | 1.26 | 2.26 | ------do------ | 2.0 | 70-80 | 6 | 89.0 |
| 4 | $Na_2S \cdot 9H_2O$ | ------do------ | 1.50 | 2.71 | ------do------ | 3.0 | 70-80 | 6 | 84.6 |
| 5 | $Na_2S \cdot 9H_2O$ | ------do------ | 1.30 | 2.34 | ------do------ | 5.0 | 70-80 | 6 | 92.5 |
| 6 | $Na_2S \cdot 9H_2O$ | ------do------ | 1.28 | 2.28 | ------do------ | 5.0 | 70-80 | 6 | 93.0 |
| 7 | $Na_2S \cdot 9H_2O$ | ------do------ | 1.26 | 2.26 | ------do------ | 10.0 | 70-80 | 6 | 93.0 |
| 8 | $Na_2S \cdot 9H_2O$ | ------do------ | 1.30 | 2.33 | Isopropanol | 5.0 | 70-80 | 6 | 96.2 |
| 9 | $Na_2S \cdot 9H_2O$ | ------do------ | 1.26 | 2.24 | Ethanol | 5.0 | 70-80 | 6 | 97.6 |
| 10 | $Na_2S \cdot 9H_2O$ | ------do------ | 1.29 | 2.31 | n-Pentanol-1 | 5.0 | 70-80 | 6 | 89.1 |
| 11 | $Na_2S \cdot 9H_2O$ | ------do------ | 1.28 | 2.29 | ------do------ | 4.0 | 70-80 | 6 | 89.8 |
| 12 | NaOH | ------do------ | 1.25 | 2.22 | None | | 76 | 6 | 0.3 |
| 13 | NaOH | ------do------ | 1.24 | 2.33 | Methanol | 5.0 | 70-80 | 6 | 95.2 |
| 14 | CaO | ------do------ | 1.25 | 2.22 | None | | 76 | 6 | 1.8 |
| 15 | CaO | ------do------ | 1.30 | 2.32 | Methanol | 5.0 | 70-80 | 6 | 93.1 |
| 16 | BaO | ------do------ | 1.25 | 2.32 | None | | 76 | 6 | 0.4 |
| 17 | BaO | ------do------ | 1.30 | 2.33 | Methanol | 5.0 | 70-80 | 6 | 92.3 |
| 18 | $Ca(OH)_2$ | ------do------ | 1.25 | 2.23 | None | | 76 | 6 | 2.5 |
| 19 | $Ca(OH)_2$ | ------do------ | 1.30 | 2.32 | Methanol | 5.0 | 70-80 | 6 | 92.3 |
| 20 | $Ca(OH)_2$ | ------do------ | 1.30 | 2.32 | Ethanol | 5.0 | 70-80 | 6 | (3) |
| 21 | $Ca(OH)_2$ | ------do------ | 1.30 | 2.32 | Tert-butanol | 5.0 | 70-80 | 6 | 94.6 |
| 22 | $Na_2S \cdot 9H_2O$ | Tertiary octyl | 1.00 | 1.82 | None | | [4]100 | 6 | 0.8 |
| 23 | $Na_2S \cdot 9H_2O$ | ------do------ | 1.00 | 1.80 | Methanol | 5.0 | 100 | 6 | 100.0 |
| 24 | $Na_2S \cdot 9H_2O$ | Tertiary dodecyl | 0.70 | 1.24 | None | | [4]100 | 6 | 0.8 |
| 25 | $Na_2S \cdot 9H_2O$ | ------do------ | 0.60 | 1.09 | Methanol | 5.0 | 100 | 6 | 60.0 |
| 26 | $Na_2S \cdot 9H_2O$ | Tertiary hexadecyl | 0.50 | 0.89 | None | | [4]100 | 6 | 0.0 |
| 27 | $Na_2S \cdot 9H_2O$ | ------do------ | 0.49 | 0.89 | Methanol | 5.0 | 100 | 6 | 42.7 |

[1] One weight percent catalyst based on total sulfur and mercaptan.
[2] Based on total sulfur and mercaptan.
[3] Reaction violent-complete in less than one hour.
[4] Temperature controller failed and temperature rose to as high as 170° F. during reaction.
[5] Product determined to be a mixture of tetra- and penta-sulfides by measurements of molecular weights and by determination of sulfur contents.

It is to be noted that in each of the runs where no alkanol promoter was used (1, 12, 14, 16, 18, 22, 24, 26) the total conversion of mercaptans was less than 3.0 percent whereas in the runs utilizing an alkanol promoter the conversion of mercaptan was over 40.0 percent and in most of the runs approached or exceeded 90.0 percent.

Having thus described the invention by providing specific examples thereof it is to be understood that no undue limitations or restrictions are to be drawn by reason thereof and that many variations and modifications are within the scope of the invention.

We claim:

1. A process for the preparation of dialkyl polysulfide which comprises reacting an alkyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline earth metal oxides, and a minor amount of an alkanol and recovering a dialkyl polysulfide product comprising a major proportion of tetra- and penta-sulfides.

2. A process for the preparation of dialkyl polysulfide which comprises reacting an alkyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline earth metal oxides, and a minor amount of an alkanol at temperatures up to 150° F. and recovering a dialkyl polysulfide product comprising a major proportion of tetra- and penta-sulfides.

8. The process of claim 2 in which the alkanol is methyl alcohol.

9. The process of claim 2 in which the alkanol is ethyl alcohol.

10. The process of claim 2 in which the catalyst is sodium methylate.

11. A process for the preparation of dialkyl polysulfide which comprises reacting tertiary butyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline earth metal oxides, and a minor amount of an alkanol at temperatures up to 150° F. and recovering ditertiary butyl polysulfide, comprising a major proportion of tetra- and penta-sulfides.

12. The process of claim 10 in which the alkanol comprises methyl alcohol present in an amount about 0.5 to about 10.0 percent by weight based on the tertiary butyl mercaptan.

13. A process for the preparation of dialkyl polysulfide which comprises reacting tertiary dodecyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline earth metal sulfides, and a minor amount of methanol at temperatures up to 150° F. and recovering di-tertiary dodecyl polysulfide, comprising a major proportion of tetra- and penta-sulfides.

14. The process for the preparation of dialkyl polysulfide which comprises reacting tertiary octyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline earth metal oxides, and a promoter comprising a minor amount of methanol at temperatures up to 150° F. and recovering di-tertiary octyl polysulfide, comprising a major proportion of tetra- and penta-sulfides.

15. The process for the preparation of dialkyl polysulfide which comprises reacting tertiary hexadecyl mercaptan with not more than a stoichiometric amount of sulfur in the presence of a catalyst selected from the group consisting of alkali metal oxides, alkali metal hydroxides, alkali metal alcoholates, alkali metal sulfides, alkali metal polysulfides and alkaline with metal sulfides, and a promoter comprising a minor amount of methanol at temperatures up to 150° F. and recovering di-tertiary hexadecyl polysulfide, comprising a major proportion of tetra- and penta-sulfides.

References Cited in the file of this patent
UNITED STATES PATENTS

| | | |
|---|---|---|
| 2,237,625 | Olin | Apr. 8, 1941 |
| 2,237,627 | Olin | Apr. 8, 1941 |
| 2,349,191 | Olin | May 16, 1944 |